No. 692,077. Patented Jan. 28, 1902.
A. SHARP.
CONTINUOUSLY VARIABLE SPEED GEAR.
(Application filed July 9, 1901.)

(No Model.) 6 Sheets—Sheet 1.

Witnesses:
Horace G. Seitz
H. Joseph Doyle

Inventor:
Archibald Sharp
by Marion & Marion
his Attorneys

No. 692,077. Patented Jan. 28, 1902.
A. SHARP.
CONTINUOUSLY VARIABLE SPEED GEAR.
(Application filed July 9, 1901.)

(No Model.) 6 Sheets—Sheet 3.

No. 692,077. Patented Jan. 28, 1902.
A. SHARP.
CONTINUOUSLY VARIABLE SPEED GEAR.
(Application filed July 9, 1901.)

(No Model.) 6 Sheets—Sheet 4.

No. 692,077. Patented Jan. 28, 1902.
A. SHARP.
CONTINUOUSLY VARIABLE SPEED GEAR.
(Application filed July 9, 1901.)
(No Model.) 6 Sheets—Sheet 6.

UNITED STATES PATENT OFFICE.

ARCHIBALD SHARP, OF LONDON, ENGLAND.

CONTINUOUSLY-VARIABLE-SPEED GEAR.

SPECIFICATION forming part of Letters Patent No. 692,077, dated January 28, 1902.

Application filed July 9, 1901. Serial No. 67,627. (No model.)

*To all whom it may concern:*

Be it known that I, ARCHIBALD SHARP, a subject of the King of Great Britain, and a resident of 47 Victoria street, Westminster, London, S. W., England, have invented certain new and useful Improvements in Continuously-Variable-Speed Gear, of which the following is a specification.

My invention relates to an apparatus for varying the speed ratio of two shafts continuously or with short intervals between certain limits.

Figure 1:
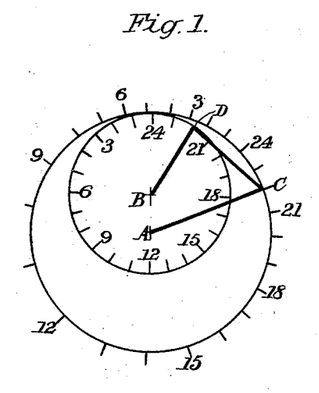
Figure 1 is a diagrammatic view of the crank mechanism.
Figure 2:
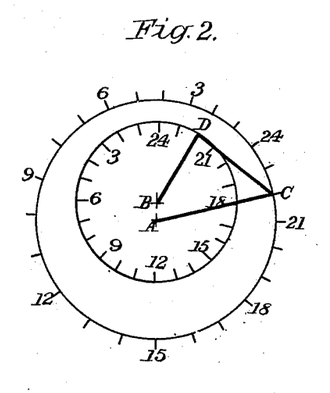
Fig. 2 is a similar view showing the parts in a different position.
Figure 3:
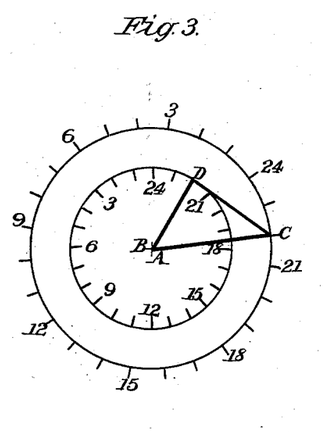
Fig. 3 is a similar view with the parts in still another position.
Figure 4:
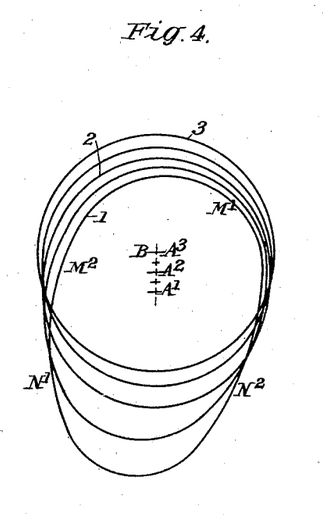
Fig. 4 is a diagram showing the varying speed ratios.

In Fig. 1, ABCD is a quadric crank mechanism consisting of two cranks AC and BD, revolving about the centers A and B, respectively, and connected by a link CD. If one crank, BD, move at constant angular speed, the angular speed of the other, AC, varies during each revolution. In other words, the speed ratio of the two shafts varies continually—that is, while the point D moves through the equal spaces indicated by the figures on the small circle, Fig. 1, the point C moves through the unequal spaces indicated by the corresponding figures on the large circle. (Hereinafter by the term "speed ratio" will be meant the ratio of the angular speed of the crank AC to the angular speed of the crank BD at the same instant.) The extent of the variation of the speed ratio depends on the relative lengths AC, BD, CD, and AB. By keeping the lengths of the cranks AC and BD the same and likewise the length of the link CD, but by bringing the centers A and B close together, Fig. 2, the inequalities of the spaces described by the point C, corresponding to the equal spaces described by the point D, become less marked. Further, if the centers A and B be made to coincide, Fig. 3, the equal spaces described by the point D will correspond with equal spaces described by the point C. For a mechanism having the relative dimensions shown in Fig. 1 the varying speed ratio is shown by the curve 1, Fig. 4, which is a polar curve having its pole at B, the length of its radius-vector indicating the value of the speed ratio, when the crank BD is in the same direction as the said radius-vector. Similarly the varying speed ratio for the mechanism shown in Fig. 2 is indicated by the curve 2, Fig. 4, while the constant-speed-ratio unity for the mechanism shown in Fig. 3 is indicated by the circle 3, Fig. 4. Besides the curves 1, 2, and 3 two intermediate curves are shown in Fig. 4, corresponding to intermediate distances of the centers A and B.

Figures 5, 6, 16, 17:
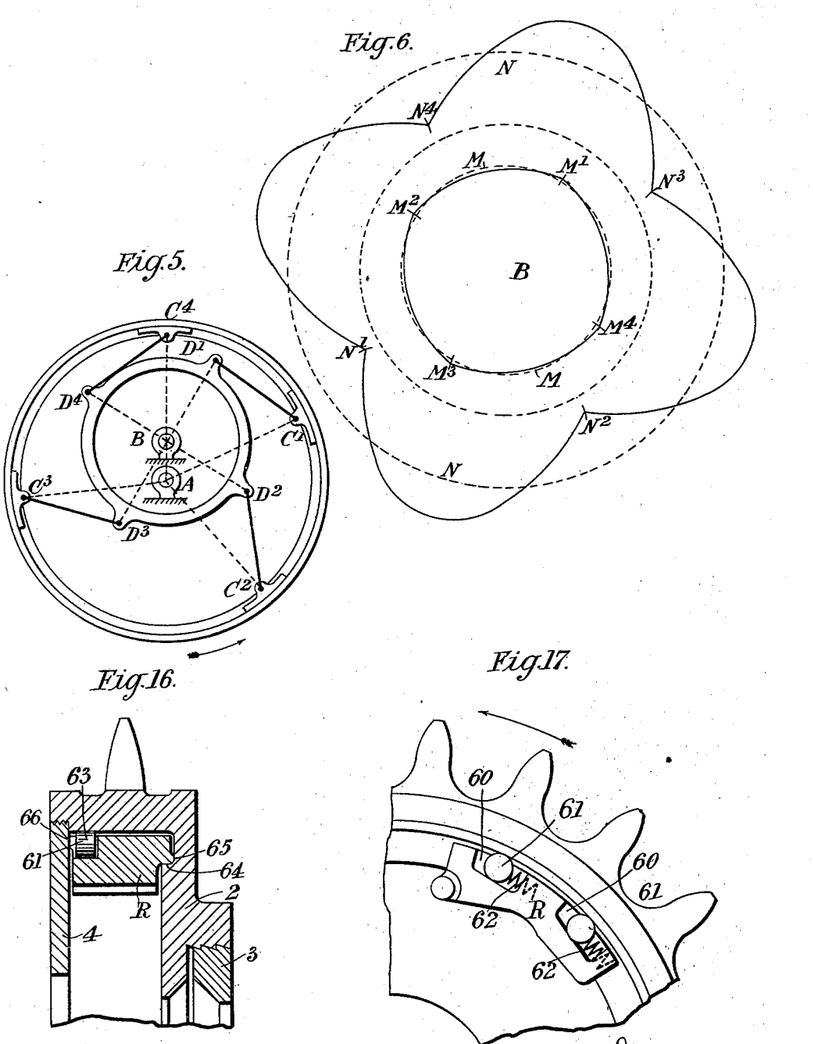
Fig. 5 is a view showing a plurality of equal cranks.
Fig. 6 shows the varying speed ratios thereof.
Figs. 16 and 17 are views of a modified form of drive-shoe, in which a roller free-wheel driving-clutch is employed.

If two, three, or more equal cranks AC' AC² be mounted loosely on a shaft at A, Fig. 5, and two, three, or more equal cranks BD' BD² be rigidly fixed to a shaft at B and corresponding pairs of cranks be connected by equal links C' D' C² D², one shaft may drive the other if each of the said cranks AC' AC² is provided with a free-wheel clutch suitably arranged. For example, if the shaft at A be the driver in the direction shown by the arrow the free-wheel clutches are arranged so that each of the cranks AC' AC² is free to overrun the shaft in the direction of the arrow and the driving takes place by means of the crank which moves at the least speed. Thus each of the quadric crank mechanisms ACBD is in action during a fraction of each revolution, and the average speed ratio of the shafts is determined principally by the minimum instantaneous speed ratio of the cranks during each revolution. The variation of the speed ratio during a revolution will now be represented by the curve $M' M^2 M^3$, Fig. 6, the portions $M' M^2 M^2 M^3$ being of the same shape as $M' M^2$, Fig. 4, the radii $BM'$ and $BM^2$ being equal and the angle $M' BM^2$ being a complete revolution divided by the number of quadric crank mechanisms used. The average speed ratio will be represented by the dotted circle MM.

It is evident that with the same mechanism as above described the shaft at B may be made the driver; but the direction of motion will be opposite to that shown by the arrow.

If the free-wheel clutches on the shaft A are arranged so that the cranks can overrun the said shaft in the direction opposite to that shown by the arrow, the average speed ratio of the shafts is determined principally by the maximum speed ratio during each revolution. The variation of the speed ratio will now be represented by the curve $N' N^2 N^3$, Fig. 6, the portions $N' N^2 N^2 N^3$ being of the same shape as $N' N^2$, Fig. 4. The average speed ratio will be represented by the dotted circle NNN.

In my invention the variation of the average speed ratio is obtained by moving the shaft centers closer together or farther apart. When A and B coincide, it is evident that the whole mechanism revolves as one piece and the speeds of the two shafts are equal at each instant—i. e., the speed ratio is always unity. By moving A and B farther apart, the dimensions AC, BD, and CD remaining constant, the variation of the instantaneous speed ratio during each revolution of the single mechanism, Fig. 1, is increased, and therefore the average speed ratio of the multiple mechanism, Fig. 5, will be greater or less than unity, according to the arrangement of the free-wheel clutches employed.

In Fig. 6 the average speed ratio (represented by the dotted circle MM) is .73—i. e, the ratio of the lowest and highest gears is as seventy-three is to one hundred. The range of variation of the varying speed ratio (indicated by the curve $M' M^2 M^3 M^4$) is less than five per cent. of the average speed ratio. This amount of variation will scarcely be appreciable in pedaling on a bicycle. The number of mechanisms—four—and the distance the shaft A is moved—three-eighths of an inch—are therefore suitable for a cycle driving-gear.

Fig. 5 shows diagrammatically one form of my invention as applied to a bicycle. B is the center of the hub-spindle, and instead of a number of separate cranks $BD' BD^2$ a drive-ring $D' D^2$ is screwed on the end of the hub and has the drive-links $D' C' D^2 C^2$ jointed to it at the points $D' D^2$. The sprocket-wheel, which is driven by the chain, is carried on ball-bearings at the center A and has formed on its inner surface a flange, forming a circular guide for a circular path, in which a number of drive-shoes $C' C^2$ engage, each drive-shoe being furnished with a free-wheel clutch. The free-wheel clutch may be of any of the well-known types. The drive-shoes are suitably jointed to the ends of the corresponding drive-links $C' D' C^2 D^2$. The hub-spindle B is rigidly fixed to the frame of the machine. The center A may be moved in a slot, (seen in Fig. 9,) arranged so as to keep the chain at practically the same tension, by suitable mechanism operated from a lever or handle within reach of the cyclist while riding.

To clamp the centers A and B at any required distance apart, a friction holding-clutch is used, in which a number of thin disks or washers $w' w^2$ are placed alternately on the shafts A and B. The said disks are pressed together by a pressure-cam 11, a spring 20 applying the pressure and the spring being controlled by mechanism operated by the cyclist while riding. I may employ any suitable form of wire transmission convenient for operating the pressure-cam or for shifting the center A of the sprocket-wheel. The two operating-handles for changing the speed ratio will preferably be such that they can be grasped simultaneously, pressure applied to the handle operating the friction holding-clutch releases the latter, and the handle which controls the movement of the center A of the sprocket-wheel can then be moved. In one arrangement the latter handle is an ordinary bicycle-handle grip rotating on the end of the handle-bar and the locking-lever is mounted on the said rotating handle.

In order that my invention may be clearly understood, I now proceed to explain in fuller detail its application to the driving-hub of a bicycle.

The spindle B is immovably fastened to the frame of the bicycle. The drive-ring D is screwed to the end of the hub-shell H and has four pins formed on it to take the inner ends of the drive-links L. The outer ends of the drive-links L carry four drive-shoes $R' R^2$, which engage with the ratchet-teeth T, formed on the inner surface of the sprocket-wheel W. (The drive-links and the drive-shoes are not shown in Fig. 7.) Each drive-shoe has springs S projecting in front and behind, and when each shoe comes near the position where it takes up the drive it is forced by the springs to engage with the ratchet-teeth T. The drive-shoe $R'$ is shown in action, Fig. 8, while the drive-shoe $R^2$ is just about to come into action. The drive-shoes have a certain amount of freedom of motion radially, so as to allow the ratchet-teeth to overrun when free-wheeling. They are provided with side projections $j$, Fig. 13, which lie in circular grooves $g$, Fig. 7, on the disks 2 and 4. When the free-wheel clutch of the drive-shoe is of the ratchet type, as shown in Fig. 8, the teeth of the drive-shoe must be made of the same pitch as those of the sprocket-wheel. In order to get a fair approximation to a continuously-variablespeed gear, it is necessary to have the pitch of the teeth small, in which case to get the necessary strength each drive-shoe must have a number of teeth engaging with those on the sprocket-wheel. The springs of the drive-shoe must then be so arranged that the rear tooth of each drive-shoe as it approaches the position in which driving begins is pressed against the ratchet-teeth of the sprocket-wheel, as shown at $R^2$, Fig. 8. As the driving effort comes on the corresponding drive-link the first effect is to press all the teeth of the drive-shoe against those on the sprocket-wheel. If the forward tooth of the drive-shoe engaged first, there would be a danger of the other teeth not engaging and slipping might occur.

The sprocket-wheel is made up of, first, an outer ring 1, with teeth for the chain formed on its outer surface and ratchet-teeth T on its inner surface; second, a disk 2, screwed to the outer ring 1 and forming a ball-race; third, an adjustable ball-race 3, screwed to the disk 2, (the combination of 2 and 3 may be a Dunlop self-adjusting bearing,) and, fourth, a guard-disk 4, which is screwed to the outer ring 1 when the drive-ring, drive-links, drive-shoes, and the sprocket-wheel, with its ball-bearing, have been assembled.

A guard-disk 5 is fastened to the hub as close as possible to the guard-disk 4 of the sprocket-wheel, so as to prevent dust and mud getting access to the drive-links and ratchet-teeth.

Figures 13, 14:
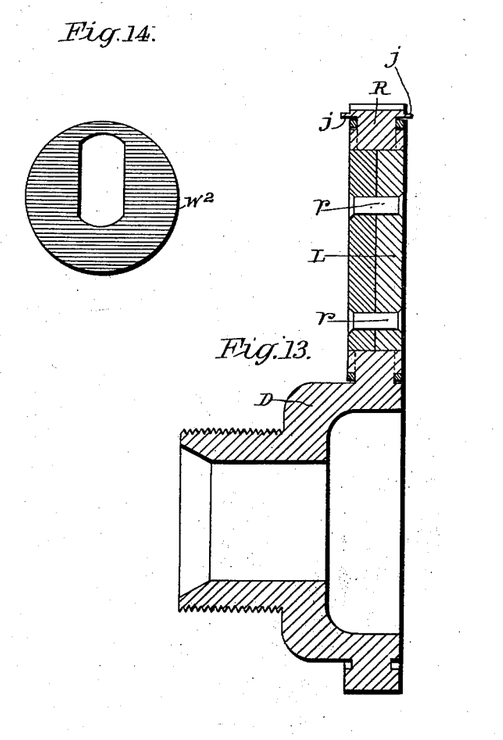
Fig. 13 is an enlarged view illustrating the drive-ring, drive-links, and drive-shoes.
Fig. 14 shows the shape of the disks placed on the axis of the sprocket-wheel.

Fig. 13 is an enlarged sectional view showing the drive-ring D, (which also forms the cup for one row of balls of the main hub-bearings,) the drive-link L, and the drive-shoe R. The driving effort is transmitted from the sprocket-wheel to the drive-shoe which is in action at the moment, which in turn transmits the driving effort by compression along the drive-link to the drive-ring. Each drive-link is made of two curved plates. The ends of each plate are made thin and have small holes which fit over small circular projections from the drive-ring and drive-pawls, respectively. Thus the drive-links and drive-shoes which are not transmitting the driving effort are kept in proper relation to the drive-ring. The two curved plates of each drive-link are riveted together by two small rivets $r$, thus jointing together the drive-ring, drive-links, and drive-shoes.

Figure 7:
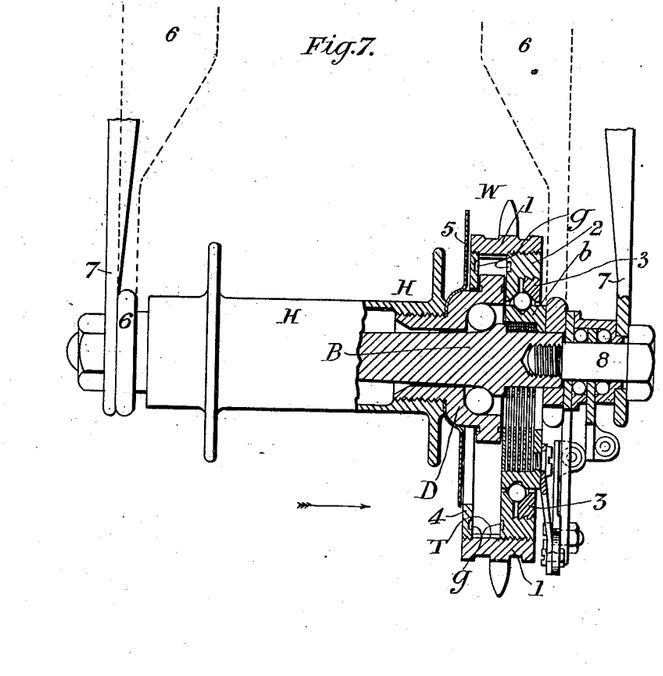
Fig. 7 is a view, partly in section, by a vertical plane through the wheel-axis.
Figure 8:
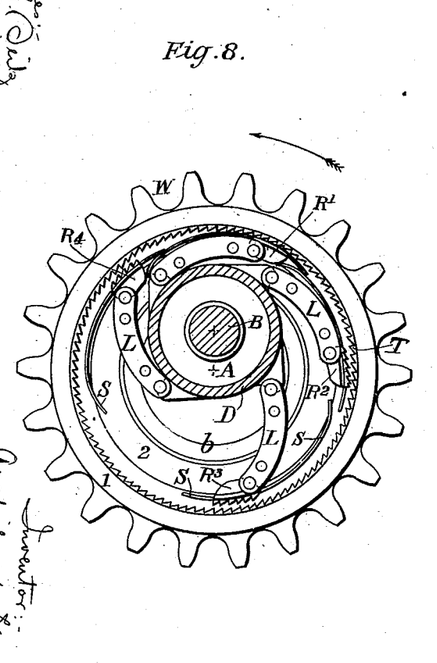
Fig. 8 is a view, partly in section, looking in the direction of the arrow in Fig. 7.
Figure 9:
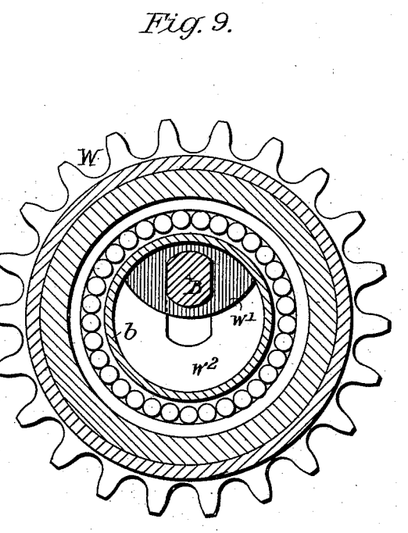
Fig. 9 is a transverse section showing how the axis of the sprocket-wheel, with its ball-bearing, is moved relatively to the hub-spindle.
Figure 12:
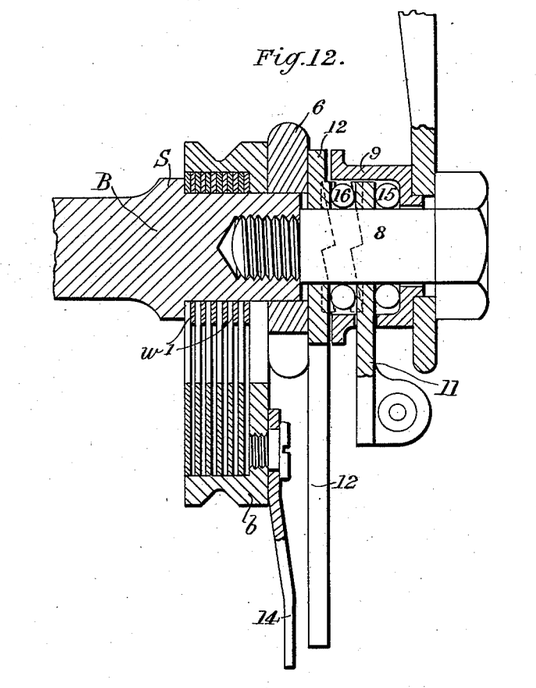
Fig. 12 is an enlarged sectional view illustrating the friction holding-clutch and pressure-cam.

The holding-clutch used to clamp the centers of the hub-spindle and sprocket-wheel at the required distance apart is shown in Figs. 7, 9, and 12. The spindle B has two flats formed at the place where the clutch comes and a number of small disks or washers of thin steel plate $w'$ are placed on it. The inner ball-race $b$ for the sprocket-wheel W is hollowed out and carries a number of larger circular washers $w^2$, of thin steel plate, which fit loosely inside it. The outlines of the disks $w'$ and $w^2$ are clearly shown in Figs. 9 and 14, respectively. In order to insure that the holding-clutch will bite properly even when saturated with oil from the bearings, the disks may have grooves stamped on their surfaces, the grooves of one surface being at right angles to the grooves of the other surface against which it is pressed, as shown by $w'$ and $w^2$, Figs. 9 and 14, respectively.

The ball-race $b$ and the large washers $w^2$ have elongated holes, which fit the flats on the hub-spindle, thus permitting of the distance between the axes of the hub-spindle and of the sprocket-wheel being varied. In assembling the parts one of the large washers $w^2$ is threaded on the spindle and comes up against a shoulder S, Fig. 12, one of the small washers $w'$ is then put on the spindle, and so on, large and small washers alternately. The ball-race $b$, carrying with it the chain-wheel W, is then put over the large washers $w^2$. The hub-spindle is placed in position between the back fork ends, the hole in the end of the lower rear fork 6, Figs. 7 and 12, being made with flat sides to correspond with the hub-spindle.

The cam-case 9, Fig. 12, is placed outside the lower rear fork 6. This and the upper rear fork 7 are firmly secured to the hub-spindle B by the pin 8, which is screwed to the end of the hub-spindle hard up to a shoulder. The lever 11, Figs. 10 and 12, has a number—say three—of inclined cam or screw surfaces formed on one side which correspond with similar surfaces on the plate 12. When the lever 11 is at one end of its throw, all the parts between the head of the screw 8 and the shoulder S on the hub-spindle are slightly loose. When the lever 11 is forced by the spring 21, Fig. 11, to the other end of its play, the aforesaid cam-surfaces tighten all the parts, the effect being the same as screwing a nut on a bolt. In order that the tightening and releasing of the clutch may take place with as little frictional resistance as possible, a row of balls 15 transmits the end pressure from the lever 11 to the end of the cam-case 9, and similarly another row of balls 16 transmits the end pressure between the cam-surfaces on the lever 11 and plate 12, respectively.

In Figs. 7 and 12 the upper rear fork 7 is shown outside the cam-case. It may, however, be placed in close proximity to the lower rear fork 6 or be brazed thereto. Again, instead of separate screw 8 being used the end of the hub-spindle may be carried through the cam-case and a washer screwed hard up against a shoulder by a nut would form the abutment for the cam-case, provision being made at the other end of the spindle for getting the parts in place.

Figure 10:
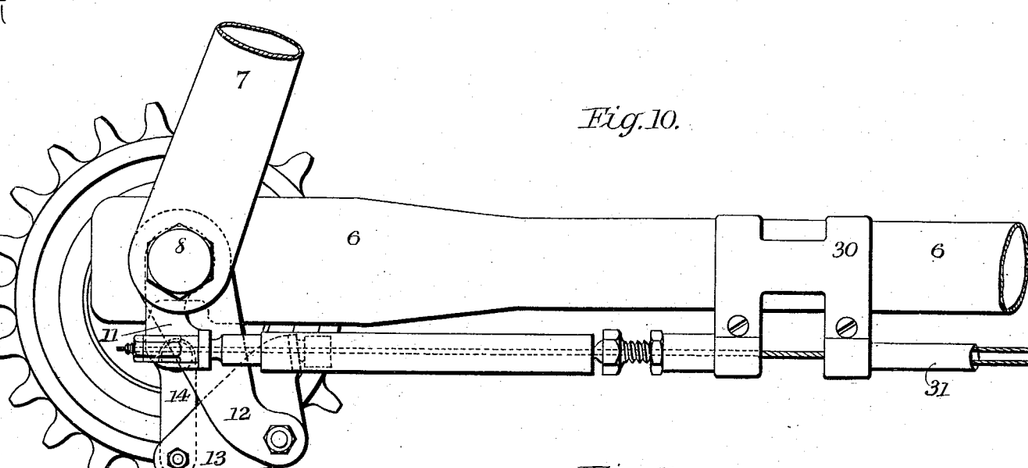
Fig. 10 is a side elevation showing the arrangement of the shifting and clutch gears.

The plate 12 is prevented from turning (by means not indicated in the drawings) and is prolonged downward and forward, Fig. 10, to form a fulcrum for the bell-crank lever 13. The link 14 is jointed at one end to the bell-crank lever 13 and at its other end to the ball-race $b$, Fig. 12. The pulling-wire 21 is fastened to the bell-crank 13 and serves to force the sprocket-wheel upward, while on slacking the said wire 21 a spiral spring forces the sprocket-wheel downward.

Figure 11:
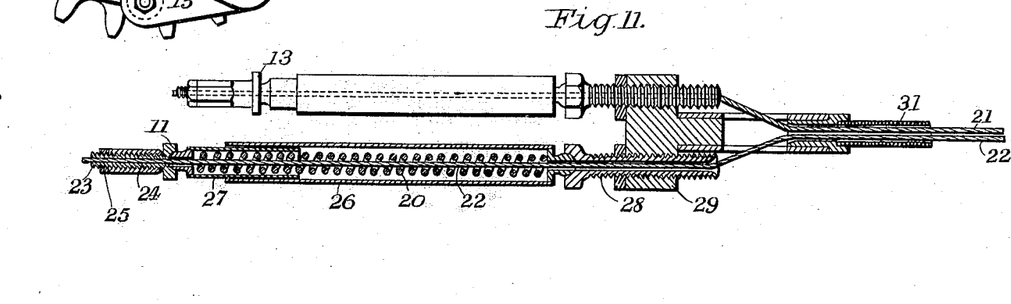
Fig. 11 is a sectional view showing the wire and springs which operate the shifting and clutch gears.

The spiral spring 20, Fig. 11, has one end pressing against the end of a tubular shield 27, which in turn rests against the end of the cam-lever 11. Its other end abuts against the end of a tubular shield 26, free to slide telescopically over the tubular shield 27. The end of the tubular shield 27 is adjusted by a tubular screw 28, screwed into a piece 29, fastened by means of a clip 30 to the lower rear fork, a lock-nut clamping the said screw when the pressure on the spring 20 is properly adjusted. The wire 22, leading from the operating-handle, passes through the said tubular screw 28, the spiral spring 20, and through a hole in the lever 11. It has a screwed ferrule 23 soldered to its end, which ferrule is held by the screwed nipple 24 and lock-nut 25. The arrangement of the wire 21 and the spring which operates the bell-crank lever B is similar.

The two wires 21 and 22 may be led through separate flexible tubes, the ends of which abut against the clip 30. In Figs. 10 and 11 they are shown led through the same tube 31, which will be of correspondingly large diameter.

Figure 15:
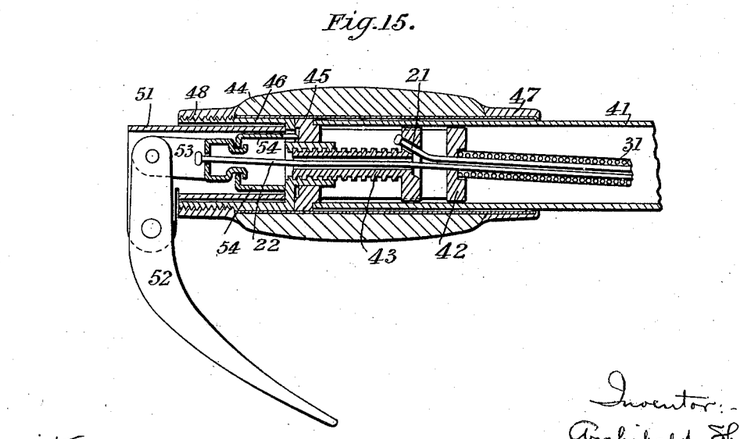
Fig. 15 is a sectional view of the operating-handle controlled by the rider.

Fig. 15 shows the details of the operating-handle controlled by the rider. One of the handle-grips is made to twist on the ends of the handle-bar 41, and thereby tighten or slacken the wire 21, which shifts the sprocket-wheel. A cylindrical plug 42 is loosely inserted inside the end of the handle-bar 41 and is notched to prevent turning relative thereto. The end of the Bowden flexible tube 31 abuts against the plug 42. The middle portion of the said plug has a hole with parallel sides slotted through it. Between the parallel sides the head of a screw 43 slides. To this screw is attached the end of the wire 21, which shifts the center of the sprocket-wheel. The handle-grip 44 is mounted on a thin tube 45, brazed or soldered to a thimble 46, free to turn on the plug 42 and having a nut engaging with the aforesaid screw 43. Small ferrules 47 and 48 secure the handle-grip on the tube 45, the latter ferrule 48 being screwed on the tube, and the former ferrule 47 being loose, but abutting against the end of the tube. The ferrule 47 may be graduated on its outside surface with a series of marks to indicate the gear to which the bicycle is speeded. Fitting loosely inside the thimble 46 is another thimble 51, on which is mounted the small lever 52. By pressing the said lever close to the handle-grip the pressure is removed from the holding-clutch, and the sprocket-wheel center can then be shifted by twisting the handle-grip. The end of the wire 22, operating the pressure-cam, is attached to the end of the lever 52 by means of the forked piece 53. Attached to the inner end of the said forked piece 53 is a thimble 54, which has a number of fingers passing through holes in the thimble 46, so as to engage with the face of the cylindrical plug 42.

Fig. 16 is a section, and Fig. 17 an elevation, showing a modification of the drive-shoe in which roller-clutches are used. The parts 1 and 2 of the sprocket-wheel referred to hereinbefore are in this case made in one piece. One, two, or more small cavities 60 are formed in each drive-shoe, and in each cavity is placed a cylindrical roller 61, which is continually pressed toward one end by the small spiral spring 62. The shape of the cavities is made as in the usual roller-clutch, and when the drive-shoe is in action the roller presses outward against the surface 63 and the drive-shoe presses inward against the surface 64 of the sprocket-wheel. This causes the drive-shoe to press sidewise against the surfaces 65 and 66 on the sprocket-wheel and the guard-disk 4, respectively, thus obtaining a driving-grip. When the drive-shoe tends to overrun the sprocket-wheel, the rollers 61 roll slightly backward to the wider ends of the cavities and the driving-grip is released.

An inspection of Fig. 8 may help toward a clearer understanding of the action of the mechanism. There are one hundred teeth shown on the ratchet-wheel W, and therefore when the sprocket-wheel is concentric with the hub-spindle while the hub is driven a quarter of a turn the sprocket-wheel turns through an angle corresponding to twenty-five teeth; but in Fig. 8 there are only eighteen teeth between the drive-shoes $R^2$ and $R'$, respectively—i. e., at highest gear, while the hub is driven a quarter-turn, the sprocket-wheel turns through an angle corresponding to eighteen teeth. By properly choosing the displacements of the axis of the sprocket-wheel from the center of the hub it is evident that the movements of the sprocket-wheel corresponding to a quarter-turn of the hub may be twenty-five, twenty-four, twenty-three, twenty-two, twenty-one, twenty, nineteen, and eighteen teeth, respectively—that is, the gears given by my invention made as illustrated, are in the ratios $\frac{25}{25}$, $\frac{25}{24}$, $\frac{25}{23}$, $\frac{25}{22}$, $\frac{25}{21}$, $\frac{25}{20}$, $\frac{25}{19}$, and $\frac{25}{18}$, which may also be expressed 1.000, 1.042, 1.087, 1.136, 1.190, 1.250, 1.316, and 1.389. Thus if sixty inches be the lowest gear of the bicycle the others will be 62.4, 65.2, 68.2, 71.4, 75.0, 79.0, and 83.3 inches, respectively.

Of course by making the teeth of the ratchet-wheel finer or coarser the intermediate gears will be closer or farther apart, while if roller-clutches be used in the drive-shoes the mechanism will give a continuously-variable-speed gear. Also the extreme gears may be made farther apart by altering the dimensions of the elementary quadric crank mechanisms used. In particular, by slightly increasing the displacements of the center of the sprocket-wheel beyond that shown in Fig. 8 additional gears having the ratios $\frac{25}{17}$ and $\frac{25}{16}$ (*i. e.*, 1.471 and 1.562) to the lowest may be obtained, corresponding (with sixty inches as the lowest gear) to gears of 88.3 and 93.7 inches, respectively.

To obtain a wider range of variation of the speed ratio, such as will be required for motor-cars, the drive-links may be arranged to be in compression while in action, and they may be made telescopic, so that when moving over the idle part of their travel they may be free to extend, or if the drive-shoes have clutches of the ratchet type they may actually leave contact with the ratchet-wheel during the inoperative part of their travel. In this case the swing of the drive-links relative to the drive-ring will be limited by a stop or spring, as will also the swing of the drive-shoes, relative to the drive-links.

In some forms of my invention the drive-links may be thin steel bands, each having one end wrapped around a circular drum and its other end jointed to the drive-shoe, provision being made to keep straight the parts not in contact with the drum, so that they may be straight at the instant they come into action.

I am aware that many of the elements of my invention are well known. The elementary quadric crank mechanism forming the basis of my invention is discussed in nearly all treatises on kinematics of mechanism, and the curve 1, Fig. 4, is found in many of these treatises—*e. g.*, Burmester's *Lehrbuch der Kinematic*, Leipsic, 1888. The combination for a two-speed gear of a ratchet-wheel, a wheel carrying pawls jointed to it, and means for making the axes of the two wheels concentric or eccentric with each other is also old—*e. g.*, Hoffbauer's German Patent No. 48,414, dated August 8, 1888. The holding-clutch described hereinbefore is merely an adaptation of the well-known Weston friction-clutch; but the combinations claimed below, which give a practical multispeed gear suitable for bicycles and the like, are, to the best of my knowledge and belief, quite new.

I claim—

1. A variable-speed mechanism for a cycle for transmitting rotary motion between two parallel shafts one of which is movably mounted with relation to the other, comprising such shafts, a ratchet drive-ring concentric with one of the said shafts, a wheel concentric with the other of the said shafts, a number of equal drive-links each jointed at one end to the said drive-ring, a number of toothed drive-shoes jointed to the other ends of the said drive-links and each engaging with the aforesaid wheel by means of a free wheel-driving clutch, means for varying the distance between said shafts, and springs projecting substantially parallel with said shoes and in front and rear thereof.

2. A variable-speed mechanism for a cycle for transmitting rotary motion between two parallel axes, consisting of a drive-ring concentric with one of the said axes, a wheel concentric with the other of the said axes, a number of equal drive-links each jointed at one end to the said drive-ring, a number of drive-shoes jointed to the other ends of the said drive-links and each engaging with the aforesaid wheel by means of a free wheel-driving clutch, and springs extending in the general direction of travel of said shoes and projecting in front and rear of each shoe, and means for varying at will the distance between the said parallel axes.

3. A variable-speed gear for a cycle, consisting of a driving-wheel hub running on ball-bearings on a spindle rigidly fastened between the fork ends, a drive-ring fastened to the hub of the driving-wheel, a sprocket-wheel mounted on a ball-bearing the axis of which can be moved away from the axis of the hub-spindle, a number of equal drive-links each jointed at one end to the said drive-ring, a number of drive-shoes jointed to the other ends of the said drive-links and each engaging with the said sprocket-wheel by means of a free wheel-driving clutch, a holding-clutch on the hub-spindle for clamping the said sprocket-wheel ball-bearing in any desired position, a cam on the hub-spindle for applying pressure to or releasing the said holding-clutch, a pair of springs and wires for operating the said cam and for shifting the axis of the sprocket-wheel, and operating handles or levers under the control of the rider; substantially as described.

4. The combination with a variable-speed mechanism for a bicycle actuated by varying the position of one part of the mechanism, of a spring which tends to force the said part into one extreme position, an operating-handle and transmission-gear by which the said part can be forced into the other extreme or any intermediate position against the action of the said spring, a holding-clutch for keeping the said part in any desired position, a second spring which always tends to force the said holding-clutch into action, and an operating-lever and transmission-gear by which the said holding-clutch can be brought out of action.

In witness whereof I have hereunto set my hand in the presence of two witnesses.

ARCHIBALD SHARP.

Witnesses:
SYDNEY McARTHUR FOWLER,
G. E. EMBLETON.